No. 670,405. Patented Mar. 19, 1901.
R. M. HUNTER.
MOTOR VEHICLE.
(Application filed Jan. 25, 1901.)

(No Model.) 2 Sheets—Sheet 1.

WITNESSES: INVENTOR

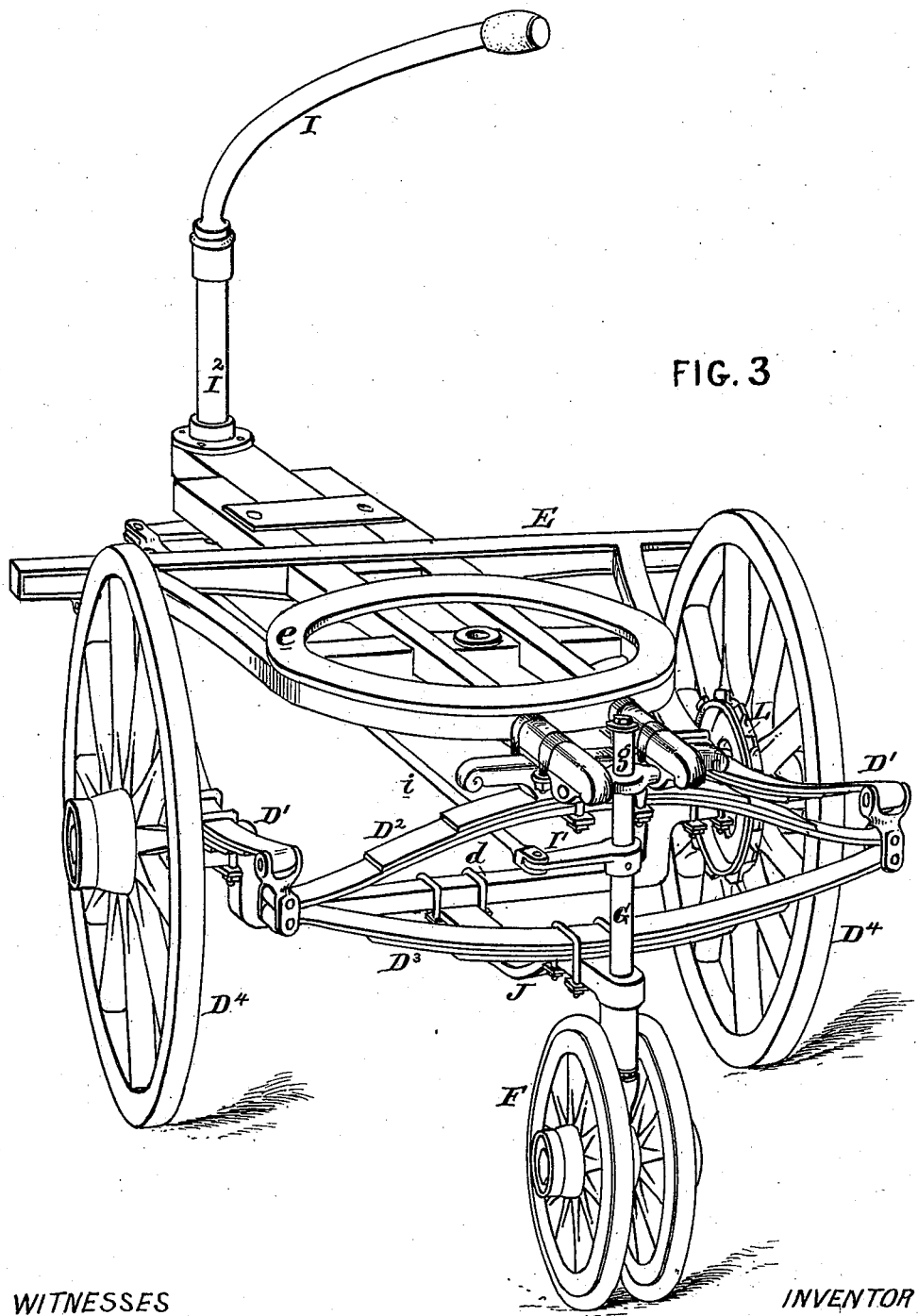

United States Patent Office.

RUDOLPH M. HUNTER, OF PHILADELPHIA, PENNSYLVANIA, ASSIGNOR TO THE TRACTOR-TRUCK AND GENERAL POWER COMPANY, OF NEW JERSEY.

MOTOR-VEHICLE.

SPECIFICATION forming part of Letters Patent No. 670,405, dated March 19, 1901.

Application filed January 25, 1901. Serial No. 44,695. (No model.)

*To all whom it may concern:*

Be it known that I, RUDOLPH M. HUNTER, of the city and county of Philadelphia, in the State of Pennsylvania, have invented an Improvement in Motor-Vehicles, of which the following is a specification.

My invention has reference to motor-vehicles; and it consists of certain improvements, typical embodiments of which are set out in the following specification and illustrated in the accompanying drawings, which form a part thereof.

The object of my invention is to provide a suitable construction of vehicle adapted for self-propulsion by mechanical means, preferably a gasolene-engine, and, more specifically considered, the invention comprehends certain features relating to the manner of applying the motive power and steering devices whereby the same may without material change be adapted to vehicles now in use and as ordinarily constructed.

In carrying out my invention I provide the usual front truck with one or more steering-wheels, preferably to the rear of the king-bolt or pivot, and combine the same with hand-controlled devices leading to convenient reach of the motorman on the front seat of the vehicle-body. Preferably these hand-controlled devices consist of a long upwardly-curved lever, the lower end of which is journaled in the front truck-frame and mechanically connected with the steering-wheels to turn them, and the upper part of which extends above the foot-board of the wagon to a convenient position to be held at all times by the operator.

The motor may be supported upon the front truck or upon the rear axle, as desired, and is mechanically connected by suitable power-transmitting devices with the wheels for rotating them.

The controlling devices for the motor extend up to the front of the vehicle-body, so as to be operated by the person in charge of the steering-lever. In case the engine is supported upon the rear axles, these controlling devices will comprise means for regulating the friction-clutches, the reversing gear or mechanism, and the oil-supply igniting devices and governor, either or all of them. They will, moreover, in addition or as a supplement, comprise means for supplying compressed air and oil to the cylinders in starting, so that perfect control may be had without the necessity of first starting by hand the rotation of the engine.

My invention also comprehends certain details of construction, which will be better understood by reference to the drawings, in which—

Figure 1:
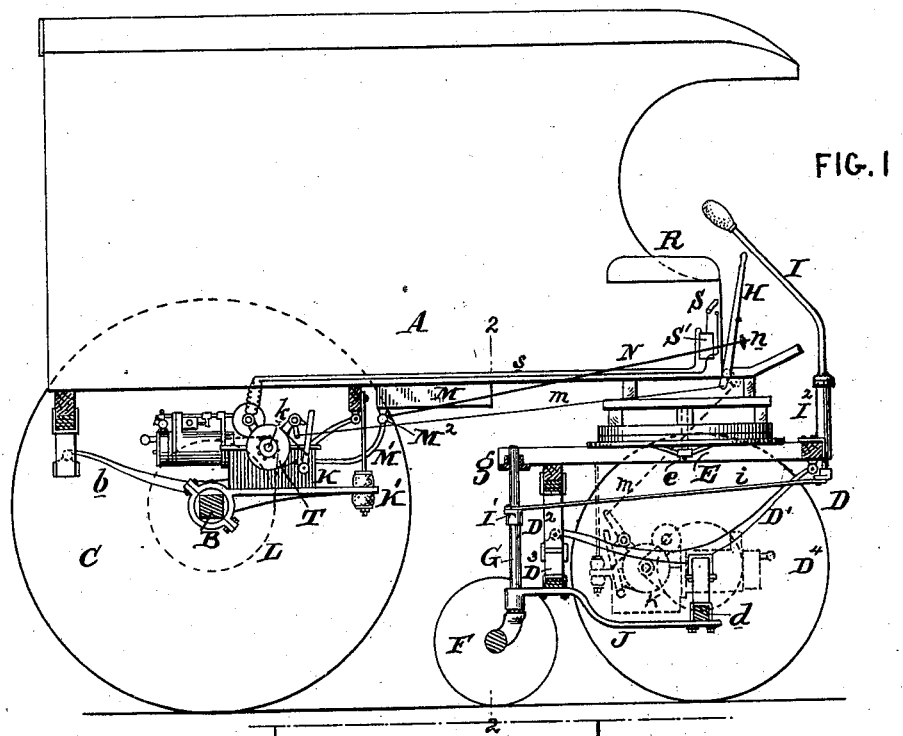
Figure 2:
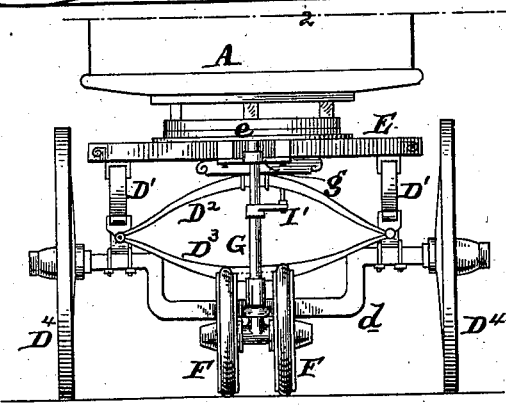
Figure 4:
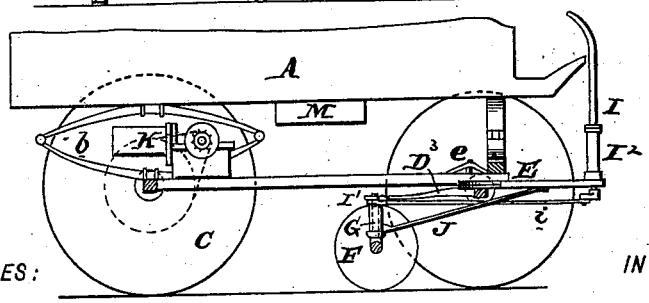

Figure 1 is a side sectional elevation of a motor-vehicle embodying my improvement. Fig. 2 is a cross-section of the same on line 2 2. Fig. 3 is a perspective view of the forward self-supporting pivoted truck, and Fig. 4 is a sectional elevation of a modified form of my invention.

A is the vehicle-body, shown as of an ordinary wagon. It is, however, to be understood that I do not confine myself to any character of body, as my invention is adapted to wagons and carriages generally.

B is the rear axle and is hung from the body by the usual springs $b$.

C represents the rear wheels.

D is the forward truck, pivoted to the body near the front by the pivot or king-bolt E. Its wheels $D^4$ are journaled upon the axle $d$, which is connected to the truck-frame by springs $D'$ $D^2$ in the usual manner.

F represents two steering-wheels, preferably rubber-tired and carried upon laterally-projecting bearings from the upright steering-shaft G. The steering-shaft is journaled near its bottom in the end of a drag-bar J, hinged to the axle $d$, and its top is loosely journaled in a bearing $g$, attached to the truck-frame D in the rear. A cross-spring $D^3$ may be attached to the drag-bar J close to the shaft G and its end linked to the points of junction of springs $D'$ $D^2$ of the pivoted truck. In this manner the steering-shaft G will be spring-supported and forced downward with an elastic pressure. If desired, the king-bolt E may be located somewhat to the rear of the axle $d$ or between the axle and steering-wheels to put more pressure upon the steering-wheels. Shaft G is provided with a lever or arm I', which connects by a rod $i$ with the steering-lever I, which is journaled at $I^2$ in the front part of the truck. By this means the lever I moves bodily with the truck, and as the operator sits approximately over the pivot E thereof the handle end of the said steering-lever is always in operative position irrespective of the angular position which the truck may assume.

R represents the operator's seat on the vehicle-body.

It will be observed that by the turning of the steering-lever I to the right or left the rear wheels F of the truck will be turned to cause the truck as a whole to change its direction of travel, and thus with great accuracy steer the vehicle as an entirety.

It will be observed that the truck may rise and fall to accommodate itself upon the steering-wheels, as the springs forming the connection between these parts will serve as compensating devices and provide the necessary elasticity, while at the same time the mechanical connection for steering will be maintained by the connecting-rod $i$, which allows for any relative movement between the truck and the shaft of the steering-wheels.

While I have shown the steering-wheels as journaled close to the upright shaft G, it is to be understood that these wheels may be pivoted on vertical or upright axes by the well-known knuckle-joints, and in such case the wheels may be separated to a greater distance and, if desired, be increased in diameter without altering or changing the general principles of construction.

K represents a gasolene-motor, the special or detail construction of which forms no part of the subject-matter of this application. The motor is shown as sleeved upon the rear axle B and supported by a link connection at K' from a vehicle-body. By this means the motor is readily attached to a vehicle of any ordinary construction. It is evident that a similar motor may be arranged on the front truck, as indicated in dotted lines, and be connected in the same manner from the upper structure of the truck or rest upon the drag-bar. Either or both of these motors may be employed as the motive power. The driving-shaft of the engine is represented at $k$ and is shown as geared at its ends to the wheels of the vehicle by means of chain-and-sprocket devices L. It is evident that in place of such power-transmitting connections ordinary spur-gearing may be employed.

M is the gasolene-tank, conveniently located upon the under side of the vehicle-body. The tank supplies gasolene to the engine by the pipe M', provided with a valve $M^2$, the latter being conveniently controlled by a rod N and handle $n$ within easy reach of the operator at the front part of the vehicle.

H is a lever for controlling the speed and reversing mechanism of the engine, which connects with the reversing-lever by means of the rod $m$. T is the speed-controlling clutch of the engine. This lever H is also in close reach of the operator at the front of the vehicle.

S is an electric switch for controlling the current from batteries S' for operating the spark or igniting devices of the engine, said switch also being located near the motor-man's seat at the forward part of the vehicle.

All of these connections—namely, those between the operating levers and switches at the front part of the vehicle and the motor or motors—are made flexible, so as to maintain proper mechanical connection with the motors notwithstanding the variation or spring action of the vehicle-body upon the axles. The connecting-pipe M', between the gasolene-tank and the motor or motors, is also made flexible, so as to maintain the supply of oil and yet permit relative movement between the oil-tank and the motor or motors. The truck may be of any suitable construction so long as it is pivoted under the front of the body and provided with steering devices carried upon and moving with the truck-frame, so as to be independent of the vehicle-body. By making the steering devices wholly independent of the vehicle-body much complication is avoided. The controlling devices for the steering-wheels may be changed or modified as may be found most convenient; but it is preferable that they shall be supported by and movable with the truck.

It is also to be understood that my invention is equally applicable to a construction of vehicle wherein the rear axle is connected by tie-bars with the upper part of the fifth-wheel structure, in which construction, as shown in Fig. 4, the free end of the engine or motor may be supported by said bars. While, moreover, I have described my invention as especially adapted to gasolene-motors, it is to be understood that the improvements are also applicable to cases where the motive power is other than gasolene—for example, compressed air, steam, electricity, or carbonic-acid gas.

I do not confine myself to minor details of construction, as they may be modified without departing from the essential principles of the invention.

Having now described my invention, what I claim as new, and desire to secure by Letters Patent, is—

1. In a motor-vehicle, a pivoted truck-frame supported upon the axle by springs and provided with two main and one or more rear steering wheels adapted to be adjusted at an angle to the main wheels of the truck, a steering device extending over the front portion of the vehicle-body and journaled directly upon or carried by and movable with the truck-frame so as to maintain its elevation with the vehicle-body, adjustable mechanical connections between the steering devices and the steering wheel or wheels for adjusting them to compensate for the spring actions of the truck, suitable motive-power devices for rotating the wheel or wheels of the vehicle to propel it consisting of a gasolene-engine sleeved upon one of the axles of the vehicle and having a connection at its free end with the spring-supported body or a connecting portion thereof, adjustable or flexible devices for controlling the gasolene-motor extending to and terminating at the forward part of the vehicle-body adjacent to the steering devices, and power-transmitting connections between the shaft of the engine and the wheels.

2. In a motor-vehicle, a vehicle-body supported upon rear axles and wheels by springs in combination with a self-supporting pivoted truck arranged under the forward part of the vehicle and consisting of an upper truck-frame directly pivoted to the vehicle-body, a main axle connected with the truck-frame by springs, independent wheels upon said axle, one or more steering-wheels at the rear of the main wheels, a drag-bar between the axle and the steering-wheels, a hand-operated steering device journaled upon the truck-frame in advance of the vehicle-body so as to maintain at all times its vertical position relatively to the vehicle-body and be within reach of the operator, a yielding connection between the said hand-operated devices and the rear steering wheel or wheels, and a motor to propel the vehicle.

3. In a motor-vehicle, the combination of a rear axle and wheels, a vehicle-body supported thereon, a forward self-supporting pivoted truck having two main wheels and one or more steering-wheels, a motor secured to the rear axle and mechanically connected to drive both the rear wheels, and a steering-lever connecting with the steering wheel or wheels of the truck and extending upward within reach of the operator at the forward part of the vehicle.

4. In a motor-vehicle, the combination of a rear axle and wheels, a vehicle-body supported thereon by springs, a forward self-supporting pivoted truck having two main wheels and one or more steering-wheels, a motor secured to the rear axle and mechanically connected to drive the rear wheel or wheels, a steering-lever connecting with the steering wheel or wheels of the truck and independent of the main wheels of said truck and extending upward within reach of the operator at the forward part of the vehicle, and flexible connections extending from the motor to the forward part of the vehicle for controlling the operation of the motor.

5. In a motor-vehicle having its body supported on the axles by springs, the combination of an engine carried upon an axle and having a clutch for throwing it in and out of transmitting condition, a controlling means arranged in the front of the vehicle, a flexible power connection between the said controlling means and the clutch of the engine, a self-supported truck at the forward part of the vehicle having two main supporting and one or more steering wheels, and steering devices extending from the front part of the vehicle-body to the steering-wheels of the truck.

6. In a motor-vehicle provided with motive power to rotate the wheels, the combination with a self-supported pivoted truck under the forward part of the vehicle provided with two main wheels and one or more steering-wheels in the rear and having a forward projection extending in front of the vehicle-body, of a steering part journaled in a bearing carried by said projection and having its upper part extended backward over the front of the body of the vehicle, and a movable mechanical power connection between the said steering part and the steering-wheels at the rear of the self-supported truck.

7. In a motor-vehicle having a motor connected to rotate the wheels, the combination of a self-supported truck consisting of a pivoted truck-frame, main axle and wheels connected to said truck-frame by means of two side and one rear transverse elliptic springs, one or more steering-wheels and their axles, a drag-bar connecting the main axle with the steering-wheel axle, and a transverse connection from the drag-bar to the juncture of the side and rear springs.

8. In a motor-vehicle having a motor connected to rotate the wheels, the combination of a self-steered truck consisting of a pivoted truck-frame, a main axle and wheels connected to said truck-frame by means of two side and one rear transverse elliptic springs, one or more steering-wheels and their axles, a drag-bar connecting the main axle with the steering-wheel axle, a transverse connection from the drag-bar to the juncture of the side and rear springs consisting of an elliptic spring, and lever mechanism for adjusting the steering-wheels relatively to the drag-bar and the main wheels.

9. In a motor-vehicle, the combination of a self-supported truck having two main and one or more steering wheels, a vehicle-body having its rear end supported upon wheels and provided with a motor to propel it and having its forward end supported upon and pivoted to the truck, and hand-controlled steering devices for controlling the steering-wheels of the truck carried wholly by and moving with the truck and extending upward to within reach of the motorman on the vehicle-body.

In testimony of which invention I hereunto set my hand.

R. M. HUNTER.

Witnesses:
R. M. KELLY,
ROBT. M. HUNTER.